United States Patent
Yoshida (10) Patent No.: US 6,459,508 B1
(45) Date of Patent: Oct. 1, 2002

(54) FACSIMILE APPARATUS

(75) Inventor: Takehiro Yoshida, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/432,698

(22) Filed: Nov. 2, 1999

(30) Foreign Application Priority Data

Nov. 6, 1998 (JP) .......................... 10-315661

(51) Int. Cl.⁷ .......................... H04N 1/00; H04N 1/40; H04N 1/04
(52) U.S. Cl. .......................... 358/474; 358/400; 358/449
(58) Field of Search .......................... 358/400, 401, 358/296, 449, 468, 474; 399/1, 2, 364, 370, 374, 376

(56) References Cited

U.S. PATENT DOCUMENTS

| | | | | |
|---|---|---|---|---|
| 5,282,050 A | * | 1/1994 | Ishizuka et al. | 358/400 |
| 5,289,290 A | * | 2/1994 | Suzuki et al. | 358/468 |
| 5,408,340 A | * | 4/1995 | Edamura | 358/468 |
| 5,532,847 A | * | 7/1996 | Maruyama | 358/498 |
| 5,642,205 A | * | 6/1997 | Kassmann | 358/436 |
| 5,815,289 A | | 9/1998 | Yoshida et al. | 358/468 |
| 5,826,133 A | * | 10/1998 | Saito et al. | 399/2 |
| 6,081,687 A | * | 6/2000 | Munemori et al. | 399/374 |
| 6,275,308 B1 | * | 8/2001 | Yoshida | 358/474 |

* cited by examiner

Primary Examiner—Kimberly A. Williams
(74) Attorney, Agent, or Firm—Fitzpatrick, Cella, Harper & Scinto (57) ABSTRACT

The invention provides a facsimile apparatus capable of smooth transmission without trouble in a receiving unit, even in case of two-side reading of a long original.

According to the invention, in case the reading of two-side original is selected, the sub scanning length of the original is detected an the transmission control is modified according to the sub scanning length. In case the sub scanning length of the original exceeds a predetermined length, the user is caused to select either to (1) transmit such original as a one-sided original to the receiving unit with informing the receiving unit of that, or (2) to transmit the original information corresponding to a predetermined length on the front side of the original as the front side information and transmit the remaining original information on the front side as the backside. In case such one-side transmission is selected, after the transmission of the original information of the front side, the original information of the back side is subsequently transmitted as a one-sided original to the receiving unit with informing the receiving unit of that, but, in case such two-side transmission is selected, after the transmission of the original information of the front side, the original information on the back side corresponding to a predetermined length is subsequently transmitted as the front side and the remaining original information on the back side is transmitted as the back side.

6 Claims, 10 Drawing Sheets

FACSIMILE APPARATUS

BACKGROUND OF THE INVENTION

1. Field of the Invention

The present invention relates to a facsimile apparatus capable particularly of transmitting two-side original.

2. Related Background Art

In the conventional facsimile apparatus capable of transmitting two-side original, in case the two-side reading is selected, the original information of the front side is transmitted with designation of the transmission of the top side (or front side), irrespective of the sub scanning length of the original information, and then the original information of the back side is transmitted with designation of the back side.

In the above-described method, the two-sided original, is read and the read data is transmitted with designating the front or back side. However, since in the receiving unit (or station), the recording sheet is often available only in a fixed size, there is encountered a major drawback that the control for the two-sided recording in the receiving unit becomes difficult if a long-sized original is transmitted from the transmitting unit.

SUMMARY OF THE INVENTION

In consideration of the foregoing, the object of the present invention is to provide a facsimile apparatus capable of smooth transmission without causing a trouble in the receiving side, even in case a long-sized two-sided original is read.

DESCRIPTION OF THE PREFERRED EMBODIMENTS

Figure 1:
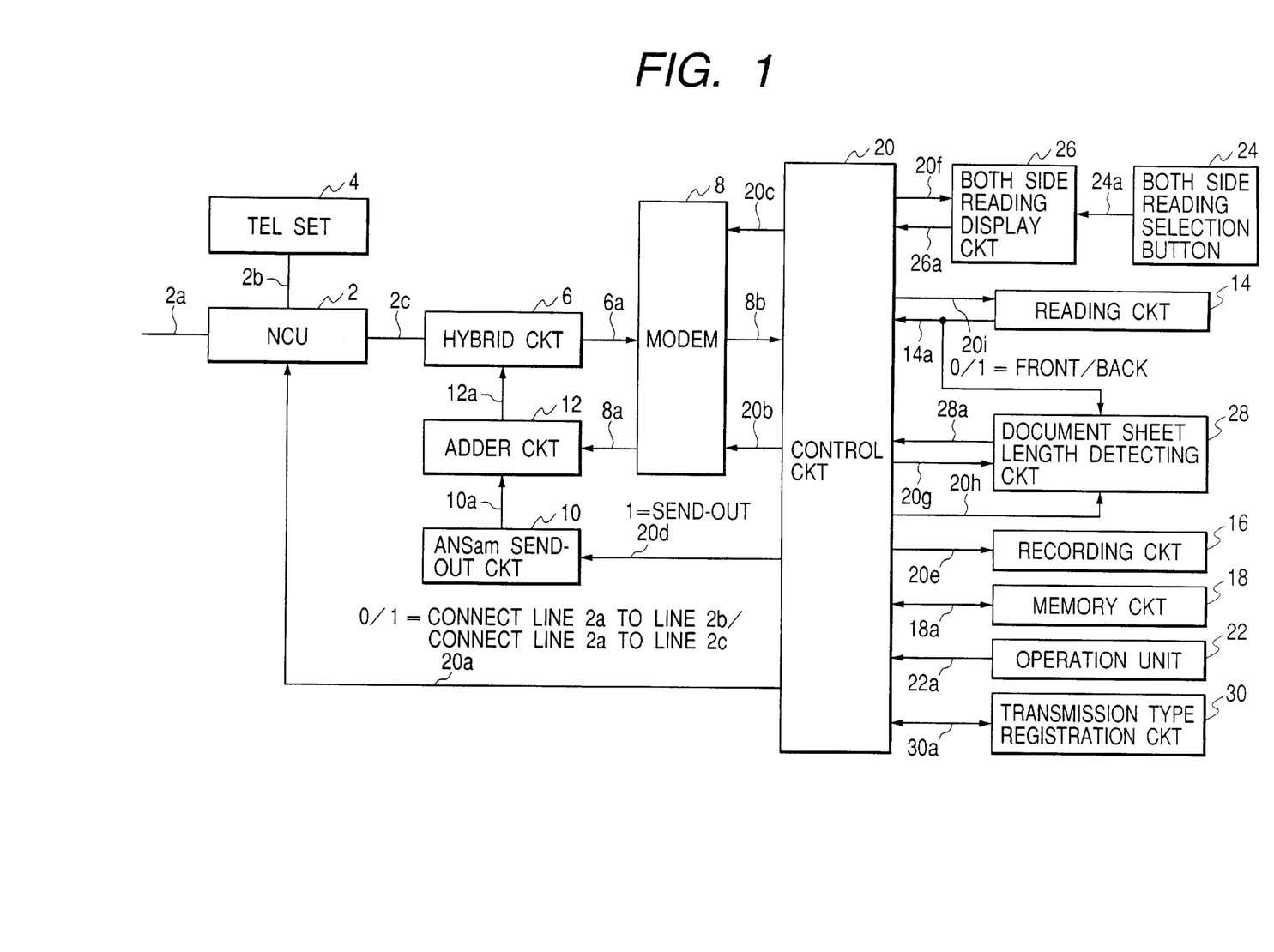
FIG. 1 is a block diagram of an embodiment of the present invention.

FIG. 1 is a block diagram showing the configuration of a facsimile apparatus, constituting an embodiment of the present invention.

Referring to FIG. 1, an NCU (network control unit) 2 is connected to a terminal of a telephone network for utilizing the same for data communication and executes connection control for the telephone network, switching to a data communication path, and retaining of a loop. The NCU 2 connects a telephone line 2a to a telephone set 4 or a facsimile apparatus according as the signal level on a signal line 20a from a control circuit 20 is "0" or "1". In the normal state, the telephone line 2a is connected to the telephone set 4.

A hybrid circuit 6 separates transmission signals and reception signals, and transmits the transmission signal from an adder circuit 12 to the telephone line 2a through the NCU 2 and receives the signal from a partner station through the NCU 2 for supply to a modem 8 through a signal line 6a.

The modem 8 executes modulation and demodulation based on the ITU-T recommendations V.8, V.21, V.27 ter, V.29, V.17 and V.34, and each transmission mode is designated by a signal line 20c. The modem 8 receives a signal outputted on a signal line 20b and outputs modulated data to a signal line 8a, and also receives a reception signal outputted on the signal line 6a and outputs demodulated data to a signal line 8b.

An ANSam send-out circuit 10, for sending out an ANSam signal. This circuit sends out the ANSam signal or none to a signal line 10a according as the signal on a signal line 20d is at a level "1" or "0". The adder circuit 12 receives the signals of the signal lines 8a and 10a and outputs the result of addition to a signal line 12a.

A reading circuit 14 reads the original image for example with a CCD, and outputs the read data to a signal line 14a. The reading circuit 14 reads the front side or back side of the original according as the signal on a signal line 20i is at a level "0" or "1".

A recording circuit 16 records, line by line, the information outputted on a signal line 20e. A memory circuit 18 is used for storing the original or encoded information of the read data, and the received or demodulated information.

An operation unit 22 is provided with a one-touch dial, a contracted number dial, numeral keys, "*" and "#" keys, a start key, a set key, a stop key, a registration key for a memory circuit 30 and other function keys, and outputs the information of a depressed key to a signal line 22a.

A both side reading selection button 24 is to be depressed in case of selecting the two-side reading (both side reading), and, upon depression, generates a depression pulse on a signal line 24a.

A both side reading display circuit 26, for displaying the selection of the two-side reading assumes a state of "no display" upon generation of a clear pulse on a signal line 20f, and thereafter repeats states of "display" and "no display" in response to depression pulses generated on the signal line 24a. The display circuit 26 outputs a signal of a level "1" or "0" on a signal line 26a respectively in the "display" or "no display" state.

An original length (sub scan length) detection circuit 28 serves to detect, in the original reading, the length of the original in the sub scanning direction. When the resolution in the sub scanning direction is designated by a signal line 20g ("0" for 3.85 line/mm, "1" for 7.7 line/mm or "2" for 15.4 line/mm) and a sub scanning length measurement start pulse is subsequently generated on a signal line 20h, the detection circuit 28 determines the original length (sub scanning length) from the read line information outputted on the signal line 14a and the resolution on the signal line 20h and outputs the original length to a signal line 28a.

A registration circuit 30 stores "transmission as one-sided original" or "transmission as two-sided original" for selecting the transmitting operation for the long-sized two-side original.

More specifically, in the present embodiment, in case the reading of a two-sided original is selected Band the original is long in size, the information on the original is read in succession from the front side and the back side. In transmitting thus read information, if "transmission as one-sided original is selected, the information of the read two-sided original is divided into a sub scanning length of a fixed sheet size corresponding in the main scanning direction to the read original size, and all the original information, both of the front and back sides, is transmitted as the information of the front side.

On the other hand, if "transmission as two-sided original" is selected, the information of the two-sided original is divided into a sub scanning length of a fixed sheet size corresponding in the main scanning direction to the read original size, and at first the original information of the front side is transmitted as the front side, and then remainder of the original information of the front side is transmitted as the back side. If the original information of the front side still remains, the above-described procedure is repeated until no remainder is existent. Then the original information of thus divided back side is transmitted as a side that is opposite to the side assigned to the immediately preceding final portion of the original information of the front side (namely if the immediately preceding transmission (final portion of the original information of the front side) is designated as "front" side, the initial portion of the original information of the back side is designated as "back" side, while if designated as "back" side, it is designated as "front" side), and then remainder of the original information of the back side is transmitted as a side opposite to the side thus assigned to the initial portion of the original information of the back side. If the original information of the back side still remains, the above-described procedure is repeated until no remainder is existent.

The "transmission as one-side original" or "transmission as two-side original" is registered in the registration circuit 30 through a signal line 30a.

The control circuit 20 controls the entire facsimile apparatus of the present embodiment capable of two-side original reading, and, particularly in the present embodiment, in case the reading of the two-sided original is selected, executes the following control of detecting the sub scanning length and varying the transmission based on such sub scanning length.

More specifically, in the present embodiment, there is contemplated the original information of A4 size only in the main scanning direction, and, if the reading of two-sided original is selected, the sub scanning length of the original information not exceeding 330 mm is transmitted with compression to 297 mm. If the sub scanning length of the original information exceeds 330 mm, the information read from the front side and the back side of the original is respectively divided into 297 mm, and, if "transmission as one-side information" is selected, the original information of the front side and that of the back side are both transmitted under the designation of the front side.

On the other hand, if "transmission as two-sided original" is selected in the registration circuit 30, the information of the two-sided original is divided into a sub scanning length of a fixed sheet size corresponding in the main scanning direction to the read original size, and at first the original information of the front side is transmitted as the front side, and then remainder of the original information of the front side is transmitted as the back side. If the original information of the front side still remains, the above-described procedure is repeated until no remainder is existent. Then the original information of thus divided back side is transmitted as a side that is opposite to the side assigned to the immediately preceding final portion of the original information of the front side (namely if the immediately preceding transmission (final portion of the original information of the front side) is designated as "front" side, the initial portion of the original information of the back side is respectively designated as "back" side), while if designated as "back" side, it is designated as "front" side, and then remainder of the original information of the back side is transmitted as a side opposite to the side thus assigned to the initial portion of the original information of the back side. If the original information of the back side still remains, the above-described procedure is repeated until no remainder is existent.

FIGS. 2 to 10 are flow charts showing the control sequence of the control circuit 20 in the present embodiment.

Figure 2:
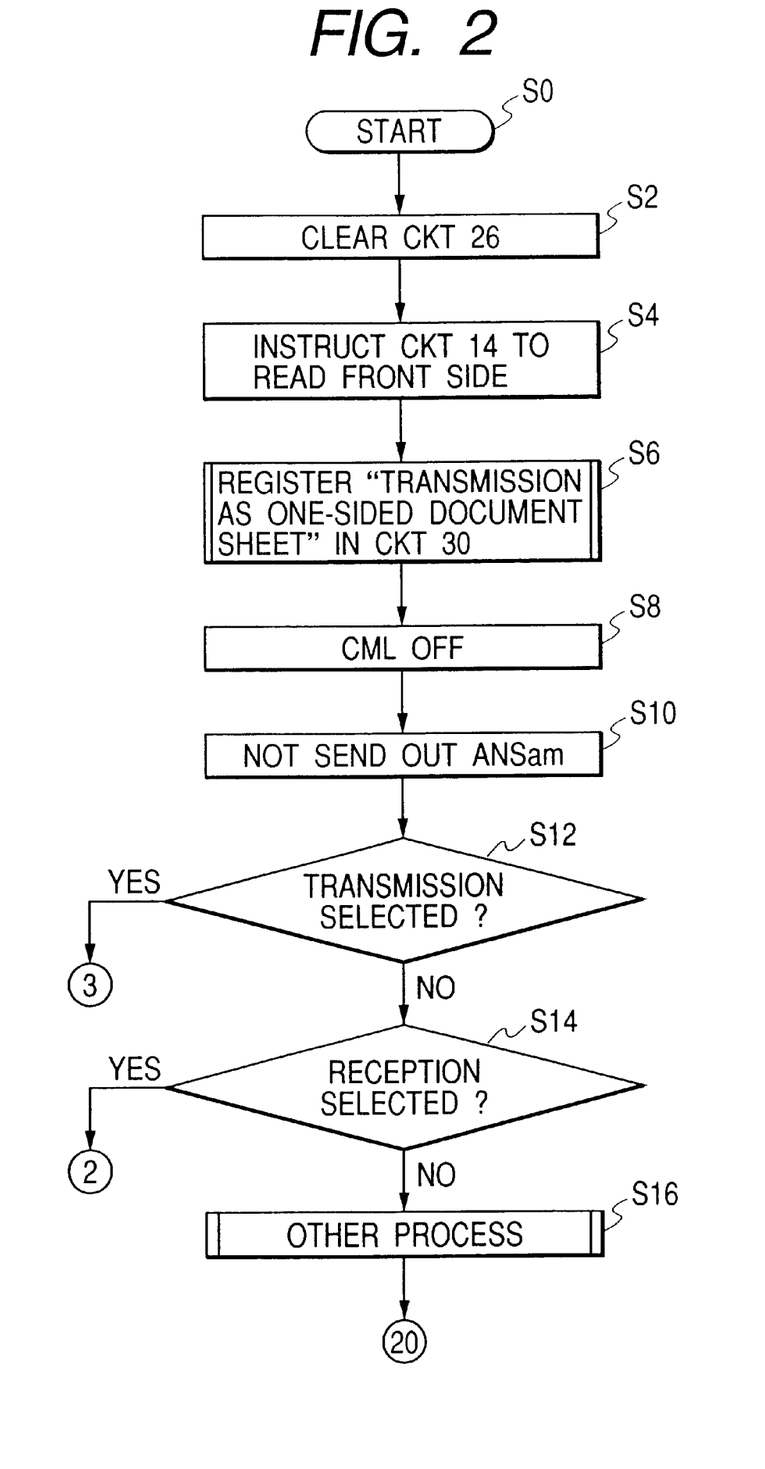
FIGS. 2, 3, 4, 5, 6, 7, 8, 9 and 10 are flow charts showing the control sequence in the above-mentioned embodiment.
Figure 3:
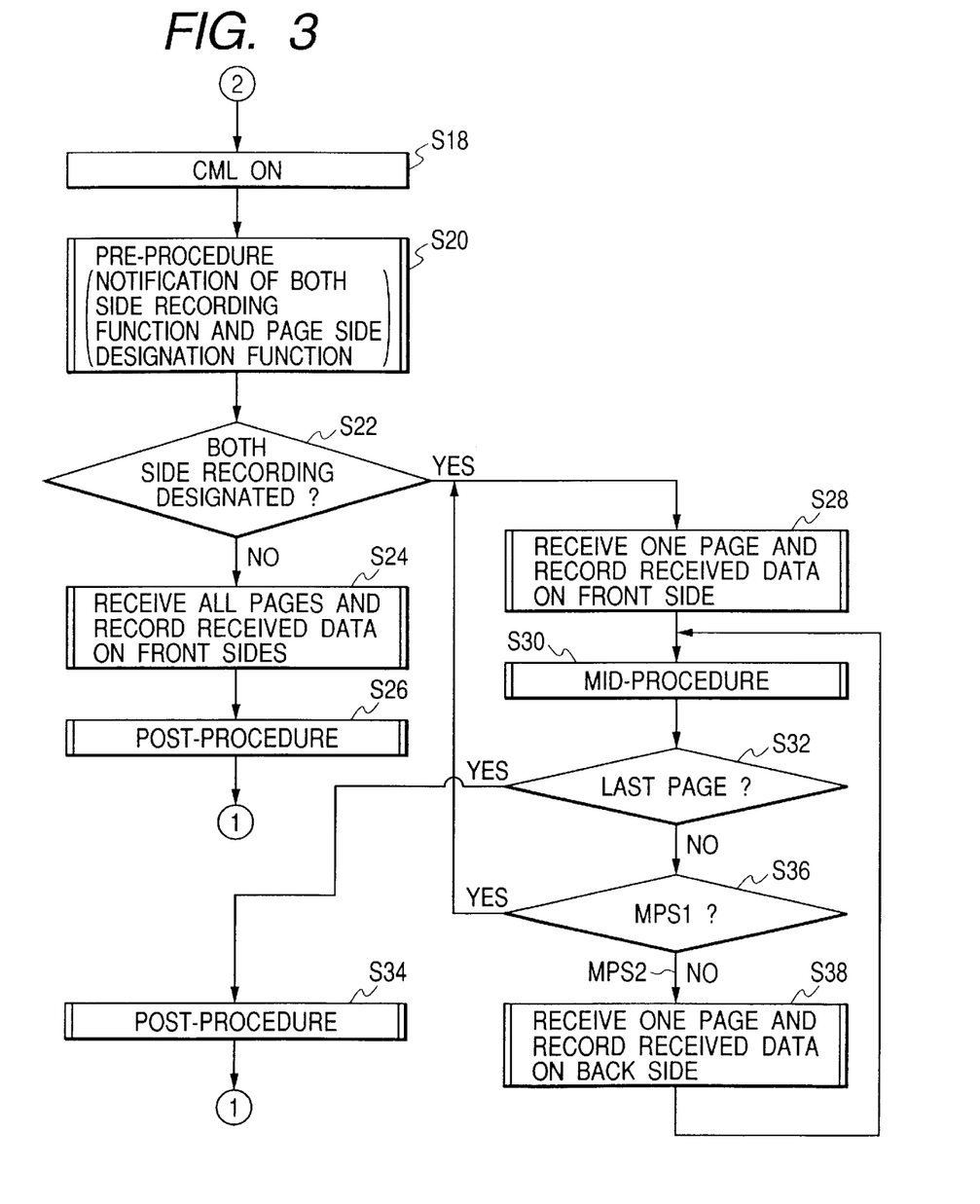
Figure 4:
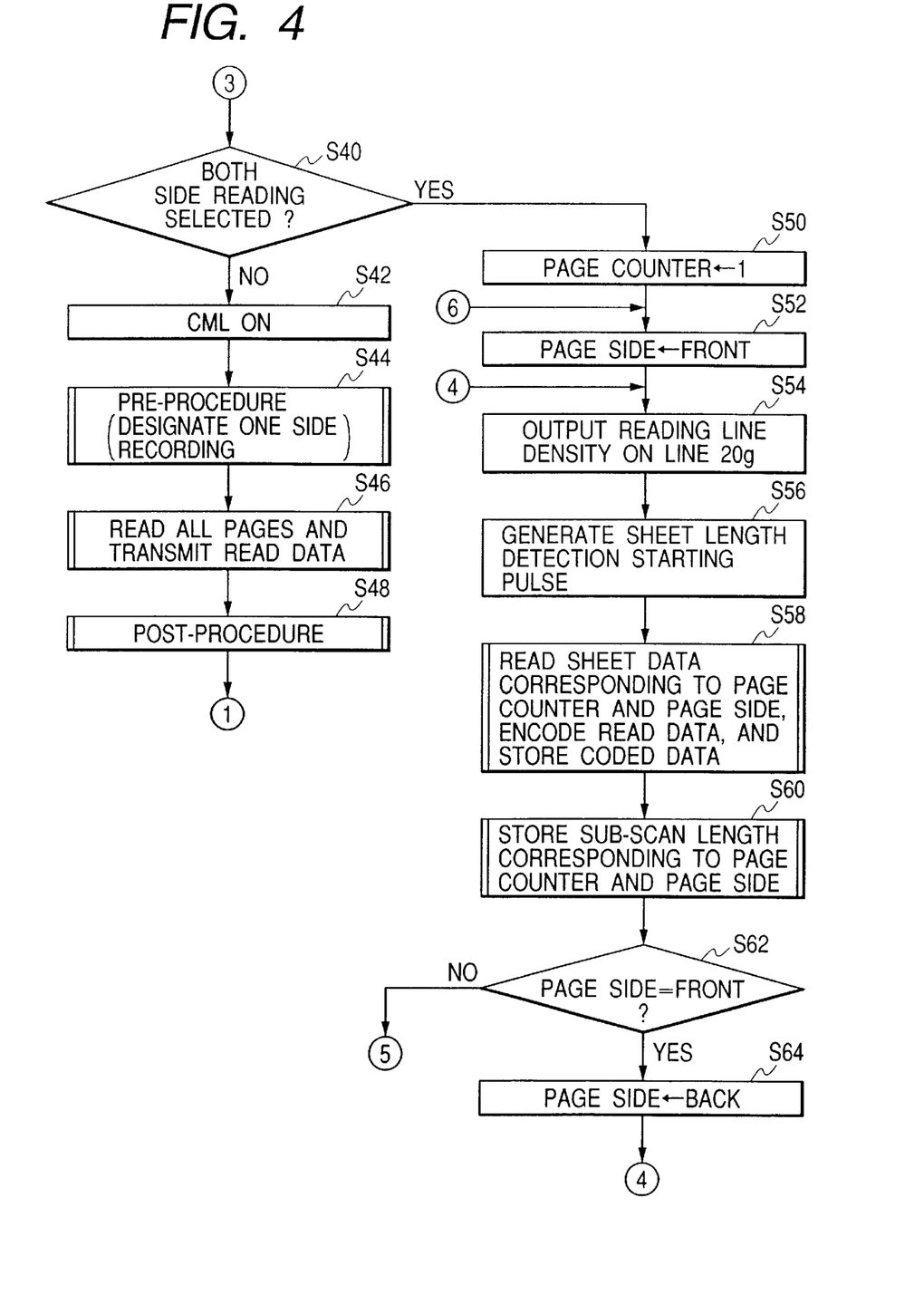
Figure 5:
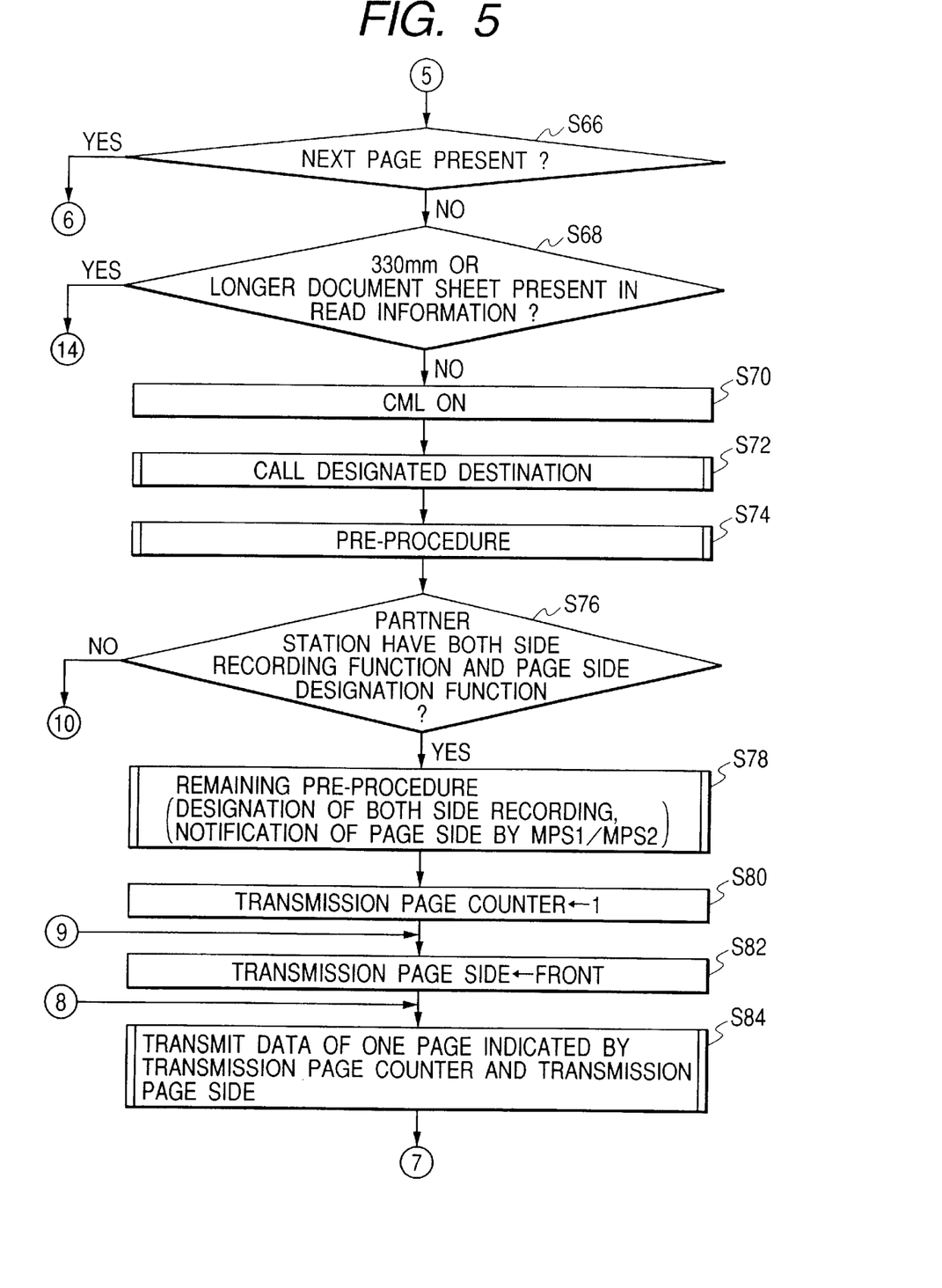
Figure 6:
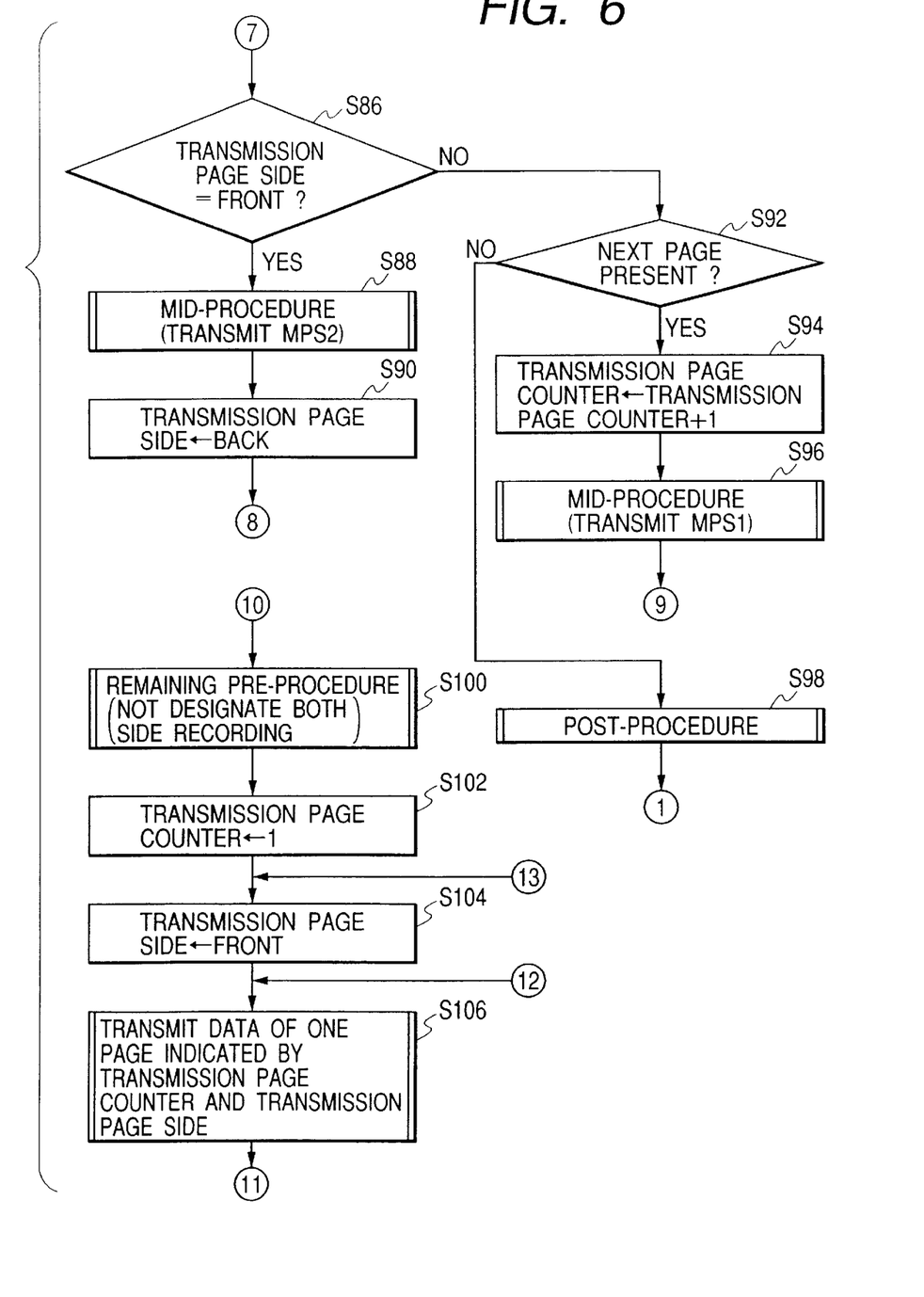
Figure 7:
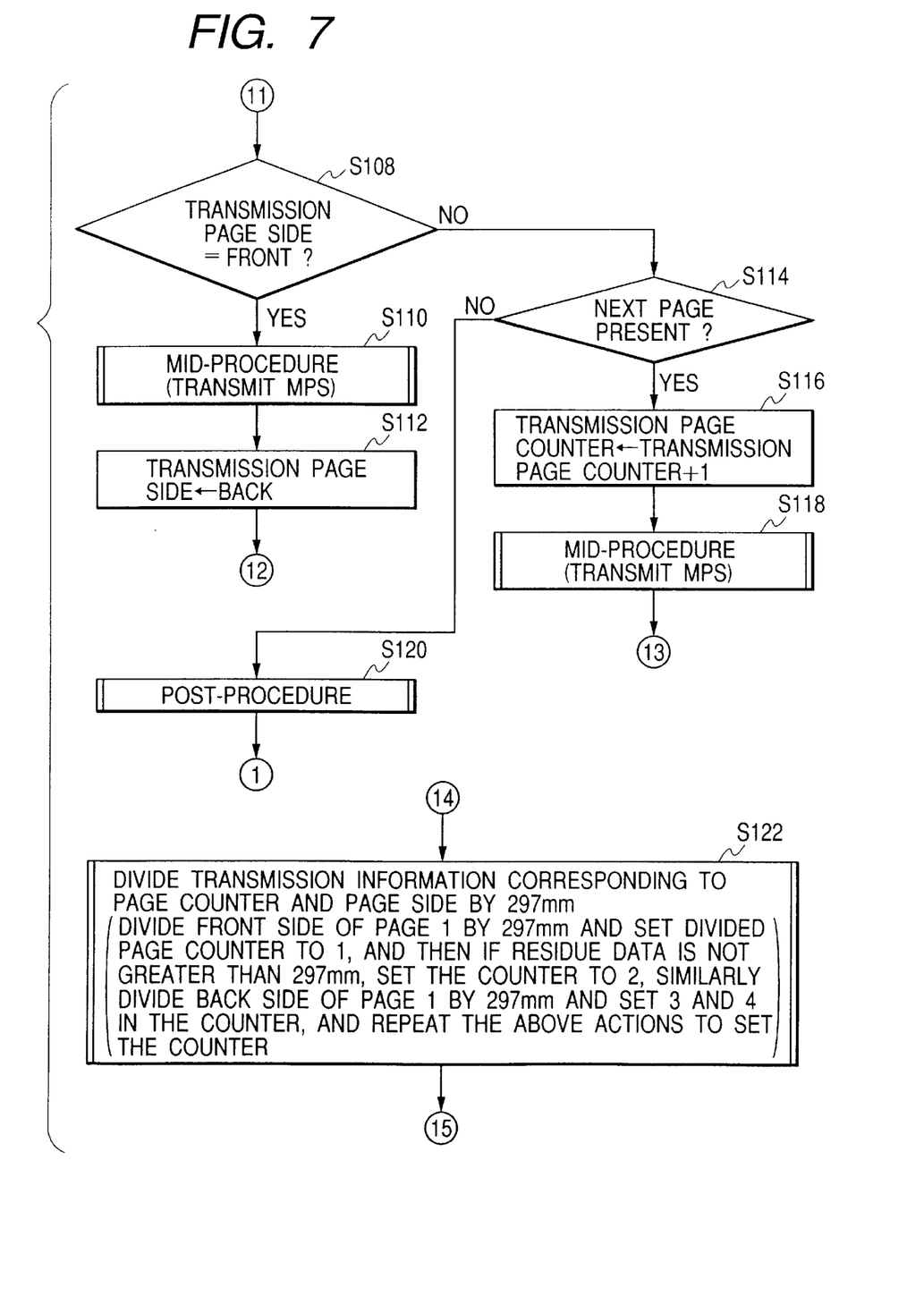

Referring to FIG. 2, a step S0 starts the control sequence, and a step S2 generates a clear pulse on the signal line 20f, whereby the two-side reading display circuit 26 does not execute display.

A step S4 outputs a signal of a level "0" on the signal line 20i, thereby designating the reading of the front side of the reading circuit 14. A step S6 registers, through the signal line 30a, "transmission as two-side original" in the transmission type registration circuit 30.

A step S8 outputs a signal of a level "0" to the signal line 20a, thereby turning off the CML. A step S10 outputs a signal of a level "0" to the signal line 20d, thereby not sending out the ANSam signal.

A step S12 discriminates whether transmission is selected, and a step S14 discriminates whether reception is selected. The sequence proceeds to a step S40 or S18 according as the transmission or reception is selected. But, if neither is selected, the sequence proceeds to a step S16 for other processes, and then to a step S178.

A step S18 outputs a signal of a level "1" to the signal line 20a, thereby turning on the CML. A step S20 executes a pre-procedure for informing that the two-side recording is possible and the front or back side can be designated by an MPS signal. The next page is judged as the front side or back side according as a signal MPS1 or MPS2 is received. Also the first page is judged as the front side.

A step S22 discriminates whether the two-side recording (both side recording) is designated from the transmission unit, and the sequence proceeds to a step S28 or S24 according as the two-side recording is designated or it is not.

A step S24 executes reception of the image signal of all the pages and recording thereof on the front side, and a step S26 executes a post procedure, whereupon the sequence proceeds to the step S8.

A step S28 executes reception of the image signal of one page and recording thereof on the front side, and a step S30 executes a post procedure. A step S32 discriminates whether the pages is the last page, and, if so, the sequence proceeds to a step S34 for the post procedure and then to the step S8.

If not the last page, the sequence proceeds to a step S36 for discriminating whether the MPS1 signal is received, and the sequence proceeds to the step S28 if the MPS1 signal is received, but, if the MPS2 signal is received, the sequence proceeds to a step S38 for receiving the image signal of a page and recording the same on the back side of the recording sheet and then to the step S30.

A step S40 enters the information of the signal line 26a for discriminating whether the two-side reading is selected, and the sequence proceeds to a step S50 or S42 according as the two-side reading is selected or not.

A step S42 outputs a signal of a level "1" to the signal line 20a, thereby turning on the CML. A step S44 executes a pre-procedure, designating the one-side recording. Then a step S46 executes reading of the image signal of the front side of all the pages and transmission thereof. Then the sequence proceeds to a step S48 for post procedure and then to the step S8.

A step S50 sets "1" in a page counter. A step S52 sets the front side as the page side, then a step S54 outputs the reading line density to the signal line 20g, and a step S56 generates the original length measurement start pulse on a signal line 20h. A step S58 reads the original information corresponding to the page counter and the page side, encodes and stores the information in the memory. A step S60 memorizes the sub scanning length, corresponding to the page counter and the page side.

A step S62 judges the content of the page side, and, if it is front side, the sequence proceeds to a step S64 for setting the back side as next page side and then to the step S54. If it is back side the sequence proceeds to a step S66 for discriminating whether a next page exists, and the sequence proceeds to a step S52 or S68 according as the next page exists or not.

A step S68 discriminates whether an original exceeding 330 mm is present among the read information, and the sequence proceeds to a step S122 or S70 according as such original is present or it is not.

A step S70 outputs a signal of a level "1" to the signal line 20a, thereby turning on the CML. A step S72 makes a call to the designated destination, and a step S74 executes a pre-process.

A step S76 discriminates whether the partner unit has the function of two-side recording and side control by the MPS1/MPS2 signal, and the sequence proceeds to a step S78 or S100 according as the result of discrimination is affirmative or it is negative.

A step S78 executes the remaining pre-procedure, thereby informing the designation for two-side recording and the execution of designation for the page side by the MPS1/MPS2 signal. A step S80 sets "1" in a transmission page counter, then a step S82 sets the front side as the transmission page side, and a step S84 transmits the information of one page, of the side set above, designated by the transmission page counter.

A step S86 discriminates whether the transmitted page side has been the front side or the back side, and the sequence respectively proceeds to a step S88 or S92.

A step S88 executes an intermediate procedure (transmitting the MPS2 signal), then a step S90 sets the back side as the transmission page side and the sequence proceeds to the step S84.

A step S92 discriminates whether a next page is present, and the sequence proceeds to a step S94 or S98 according as the next page is present or it is absent.

A step S94 increases the value of the transmission page counter by one, then a step S96 executes an intermediate procedure (transmitting the MPS1 signal) and the sequence proceeds to the step S82. A step S98 executes a post procedure and the sequence proceeds to the step S8.

A step S100 executes the remaining pre-procedure. The two-side recording is not designated in this case. A step S102 sets "1" in the transmission page counter, then a step S104 sets the front side as the transmission page side, and a step S106 transmits the information of a page, of the side set above, designated by the transmission page counter.

A step S108 discriminates whether the transmitted page side has been the front side or the back side, and the sequence respectively proceeds to a step S110 or S114.

A step S110 executes an intermediate procedure (transmitting the MPS signal), then a step S112 sets the back side as the transmission page side and the sequence proceeds to the step S106.

A step S114 discriminates whether a next page is present, and, if absent, the sequence proceeds to a step S120 for executing a post procedure and then to the step S8. On the other hand, if the next page is present, a step S116 increases the value of the transmission page counter by one, then a step S118 executes an intermediate procedure (transmitting the MPS signal) and the sequence proceeds to the step S104.

A step S122 divides the transmission information, corresponding to the page counter and the page side, by 297 mm. More specifically, at first the front side of the first page is divided at 297 mm and thus divided information is represented as "1" by a divided page counter. The remaining information of the front side of the first page, if not exceeding 297 mm, is represented as "2" by the divided page counter. The back side of the first page is similarly divided at 297 mm and the divided portions are represented as "3" and "4" in the divided page counter. Similar operations are thereafter repeated, and the number of pages in the divided page counter is determined.

A step S124 then outputs a signal of a level "1" to the signal line 20a, thereby turning on the CML. A step S126 makes a call to the designated destination, and a step S128 executes a pre-procedure.

A step S130 discriminates whether the partner unit has the function of two-side recording and side control by the MPS1/MPS2 signal, and the sequence proceeds to a step S132 or S156 according as the result of discrimination is affirmative or it is negative.

A step S132 enters the information of the signal line 30a for checking the transmission mode of the registration circuit 30, and the sequence proceeds to a step S134 or S156 according as "transmission as two-side original" or "transmission as one-side original" is registered.

A step S134 executes the remaining pre-procedure, thereby informing the designation for two-side recording and the execution of designation for the page side by the MPS1/MPS2 signal. A step S136 sets the front side for the page side, then a step S138 sets "1" in the divided page counter, and a step S140 transmits the information of a page of the divided page counter.

A step S142 discriminates whether the transmitted page side has been the front side, and the sequence respectively proceeds to a step S144 or S148 according as the front side or the back side has been designated.

A step S144 executes an intermediate procedure (transmitting the MPS2 signal), then a step S146 sets the back side as the page side and the sequence proceeds to the step S140.

A step S148 discriminates whether a next divided page is present, and, if absent, the sequence proceeds to a step S155 for executing a post procedure and then to the step S8.

On the other hand, of a next divided page is present, the sequence proceeds to a step S150 for increasing the value of the divided page counter by one. Subsequently a step S152 executes an intermediate procedure (transmitting the MPS1 signal), then a step S154 sets the front side as the designated side and the sequence proceeds to the step S140.

A step S156 executes the remaining pre-procedure. The two-side recording is not designated in this case. A step S158 sets "1" in the divided page counter, then a step S160 sets the front side as the designated side, and a step S162 transmits the information of a page of the divided page counter.

A step S164 discriminates whether the side designation has been the front side, and the sequence proceeds to a step S166 or S170 according as the front side or back side is designated.

A step S166 executes an intermediate procedure (transmitting the MPS signal), then a step S168 sets the back side as the side designatio, and the sequence proceeds to the step S162.

A step S170 discriminates whether a next divided page is present, and, if present, the sequence proceeds to a step S172, but, if absent, the sequence proceeds to a step S176 for executing a post procedure and then to the step S8.

A step S172 increases the value of the divided page counter by one, and a step S174 executes an intermediate procedure (transmitting the MPS signal).

A step S178 enters the information of the signal line 22a for discriminating whether the registration in the registration circuit 30 is selected, and, if selected, the sequence proceeds to a step S180 to register, in the registration circuit 30, "transmission as two-side original" or "transmission as one-side original" to the receiving unit, and the sequence then proceeds to the step S8. On the other hand, if not selected, the sequence directly proceeds to the step S8.

In the foregoing explanation, the functions of the control circuit are executed by a CPU therein based on a program stored in a ROM or a RAM therein, but the present invention may also be attained by storing such program in an external memory medium such as a floppy disk, a hard disk, an optical disk, a CD-ROM or a memory card, fetching such program into the control circuit by an exclusive reading device and executing it by the CPU in the control unit.

Also the foregoing embodiment has been explained by a facsimile apparatus of stand-alone type, but the present invention is not limited to such embodiment and is likewise applicable to the control of data communication in a comprehensive data processing system in which copying function, electronic filing function, data processing function etc. are combined with the communicating function.

Furthermore, the original information of A4 size alone is contemplated in the foregoing embodiment, but similar control is possible for other sizes. Besides, the specific numerical values mentioned in the foregoing embodiment are merely an example and may be suitably altered.

As explained in the foregoing, in case of selecting the two-side reading for a long-sized original, the present invention allows to select whether to transmit the information of the two-sided original as a one-sided original by a predetermined length or to transmit the information of the two-sided original as a two-sided original by a predetermined length, to the receiving unit, thereby enabling the transmission matching the actual situation of the receiving unit and ensuing the smooth transmitting operation.

What is claimed is:

1. A facsimile apparatus with a function for reading a two-sided original, comprising:
    two-side reading selection means for selecting reading of a two-sided original;
    sub-scanning length detection means for detecting a sub scanning length of the two-sided original;
    control means for, in a case in which said two-side reading selection means selects reading of the two-sided original, causing detection of the sub scanning length of the two-sided original by said sub scanning length detection means and varying a transmission control based on the sub scanning length; and
    transmitting operation selection means for, in a case in which the sub scanning length of the two-sided original exceeds a predetermined length, transmitting the two-sided original as a one-sided original to a receiving unit and informing the receiving unit of that, or transmitting, as front side information, information of the two-sided original corresponding to a predetermined length on a front side thereof and transmitting remaining information on the front side of the two-sided original as back side information.

2. A facsimile apparatus according to claim 1, wherein,
    in a case in which transmission as a one-sided original is selected, after transmission of original information of a front side, original information of a back side is subsequently transmitted as one-sided information to the receiving unit and the receiving unit is informed of that, and,
    in a case in which transmission as a two-sided original is selected, after transmission of original information of a front side, original information of a back side corresponding to a predetermined length is subsequently transmitted as a front side and remaining original information of the back side is transmitted as a back side.

3. A storage medium storing a program for executing a control method for a facsimile apparatus with a function for reading a two-sided original, the program comprising:
    code for a two-side reading selection step of selecting reading of a two-sided original;
    code for a sub scanning length detection step of detecting a sub scanning length of the two-sided original;
    code for a control step of, in a case in which the two-side reading selection step selects reading of a two-sided original, causing detection of the sub scanning length of the two-sided original in the sub scanning length detection step and varying a transmission control based on the sub scanning length; and
    code for a transmitting operation selection step of, in a case in which the sub scanning length of the two-sided original exceeds a predetermined length, transmitting the two-sided original as a one-sided original to a receiving unit and informing the receiving unit of that, or transmitting, as front side information, information of the two-sided original corresponding to a predetermined length on a front side thereof and transmitting remaining information on the front side of the two-sided original as back side information.

4. A storage medium storing a program for executing a control method for a facsimile apparatus according to claim 3, wherein,
    in a case in which transmission as a one-sided original is selected, after transmission of original information of a front side, original information of a back side is subsequently transmitted as one-sided information to the receiving unit and the receiving unit is informed of that, and,
    in a case in which transmission as a two-sided original is selected, after transmission of original information of a front side, original information of a back side corresponding to a predetermined length is subsequently transmitted as a front side and remaining original information of the back side is transmitted as a back side.

5. A control method for a facsimile apparatus with a function for reading a two-sided original, comprising:
    a two-side reading selection step of selecting reading of a two-sided original;
    a sub scanning length detection step of detecting a sub scanning length of the two-sided original;
    a control step of, in a case in which said two-side reading selection step selects reading of a two-sided original, causing detection of the sub scanning length of the two-sided original in said sub scanning length detection step and varying a transmission control based on the sub scanning length; and a transmitting operation selection step of, in a case in which the sub scanning length of the two-sided original exceeds a predetermined length, transmitting the two-sided original as a one-sided original to a receiving unit and informing the receiving unit of that, or transmitting, as front side information, information of the two-sided original corresponding to a predetermined length on a front side thereof and transmitting remaining information on the front side of the two-sided original as back side information.

6. A control method for a facsimile apparatus according to claim 5, wherein, in a case in which transmission as a one-sided original is selected, after transmission of original information of a front side, original information of a back side is subsequently transmitted as one-sided information to the receiving unit and the receiving unit is informed of that, and, in a case in which transmission as a two-sided original is selected, after transmission of original information of a front side, original information of a back side corresponding to a predetermined length is subsequently transmitted as a front side and remaining original information of the back side is transmitted as a back side.

* * * * *

UNITED STATES PATENT AND TRADEMARK OFFICE
CERTIFICATE OF CORRECTION

PATENT NO. : 6,459,508 B1
DATED : October 1, 2002
INVENTOR(S) : Takehiro Yoshida It is certified that error appears in the above-identified patent and that said Letters Patent is hereby corrected as shown below:

Title page,
Item [57], ABSTRACT,
Line 6, "an" should read -- and --.
Line 15, "backside." should read -- back side. --.

Figure 8:
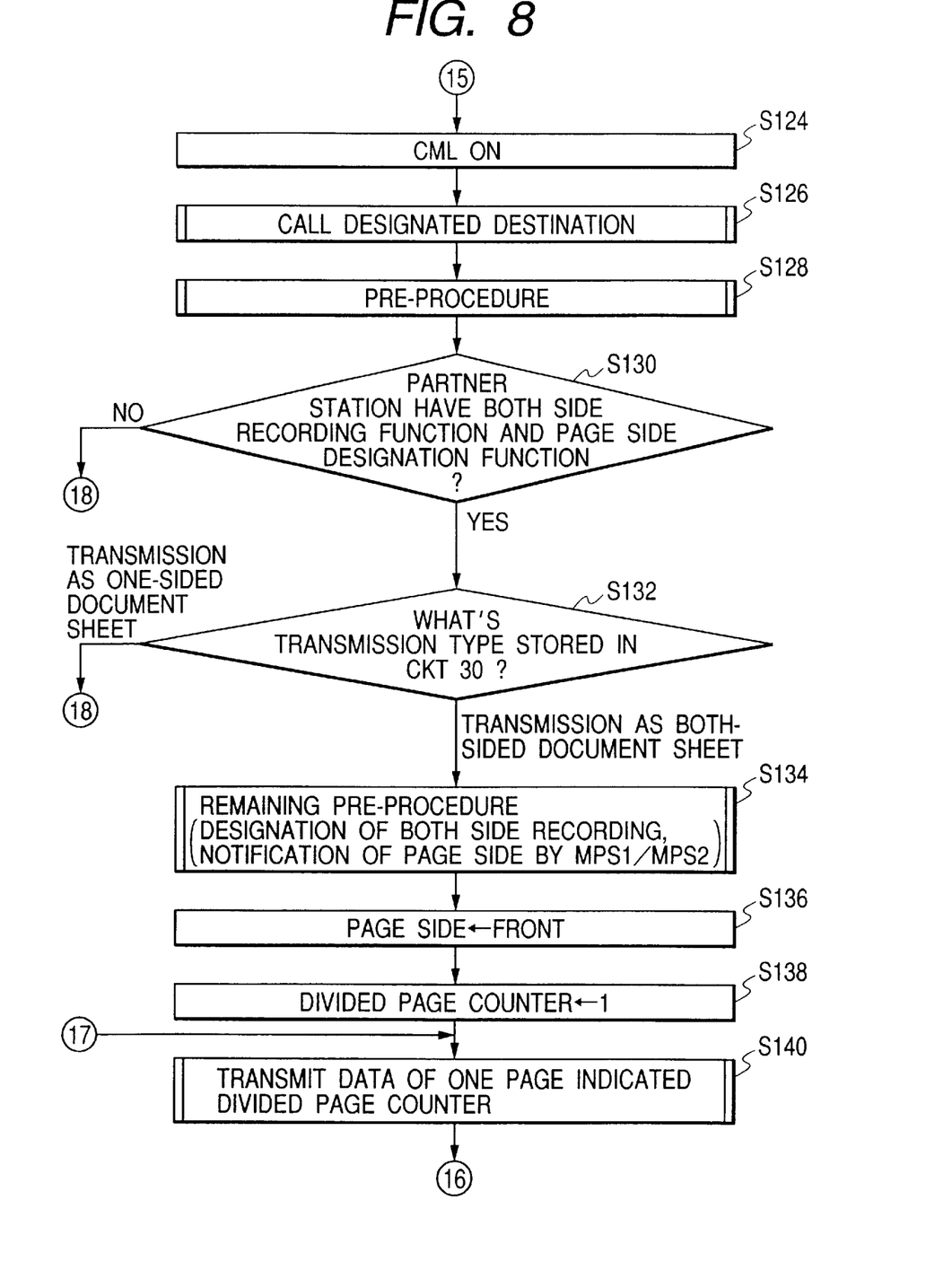
Figure 9:
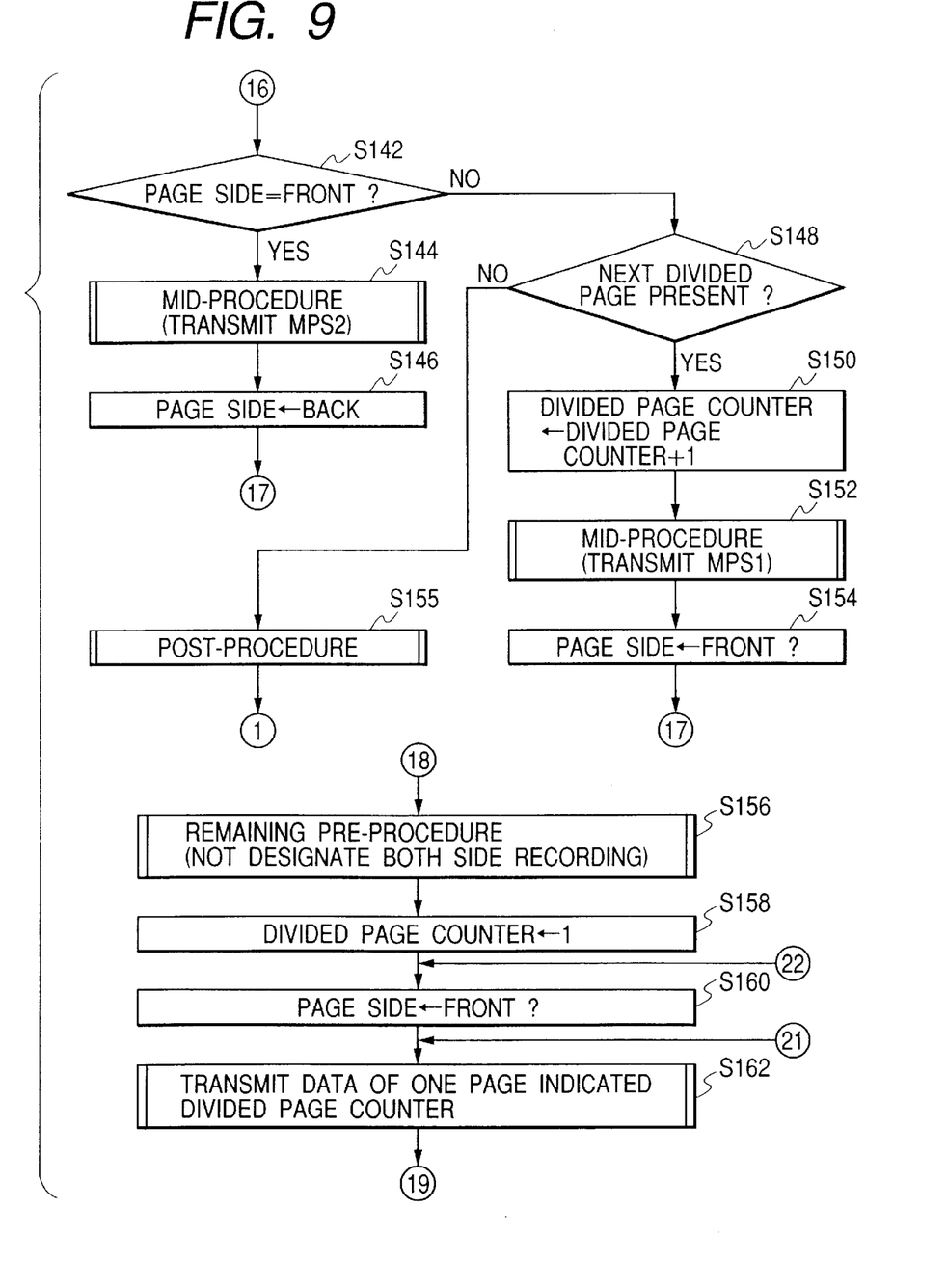
Figure 10:
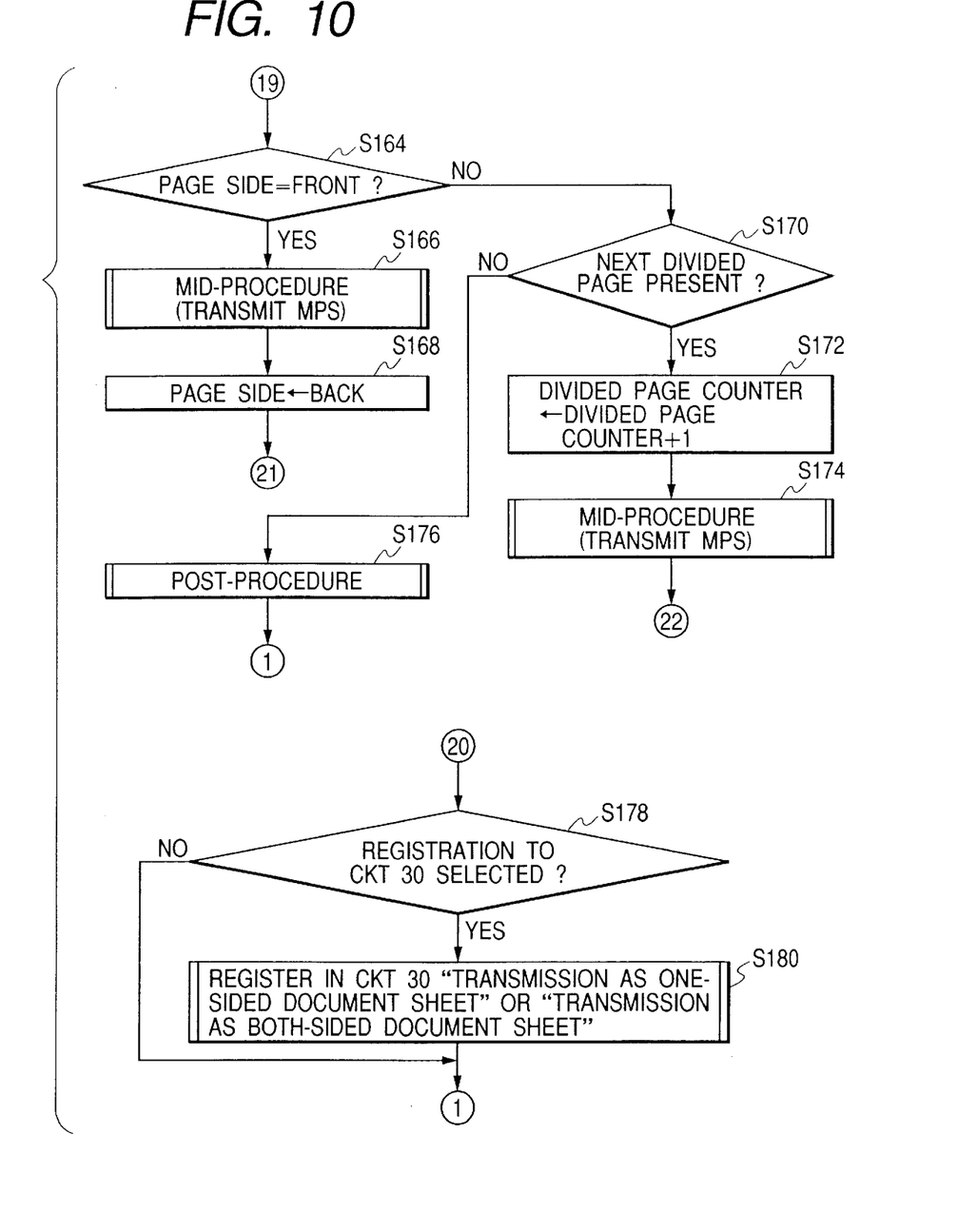

Drawings
Fig. 8, "WHAT'S" should read -- WHAT IS --.

Column 1,
Line 28, "a" should be deleted.
Line 48, "according as" should read -- depending on whether --.
Line 67, "signal. This circuit" should read -- signal, --.

Column 2,
Line 1, "according as" should read -- depending on whether --.
Line 8, "according as" should read -- depending on whether --.
Line 48, "Band" should read -- and --.
Line 52, "original" should read -- original" --.
Line 67, "is existent." should read -- exists. --.

Column 3,
Line 13, "is existent." should read -- exists. --.
Line 44, "is existent." should read -- exists. --.
Line 58, "is exis-" should read -- exists. --.
Line 59, "tent." should be deleted.

Column 4,
Line 12, "according as" should read -- depending on whether --.
Line 21, "according as" should read -- depending on whether --.
Line 26, "according as" should read -- depending on whether --.
Line 35, "pages" should read -- page --.
Line 46, "according as" should read -- depending on whether --.

UNITED STATES PATENT AND TRADEMARK OFFICE
CERTIFICATE OF CORRECTION

PATENT NO. : 6,459,508 B1
DATED : October 1, 2002
INVENTOR(S) : Takehiro Yoshida It is certified that error appears in the above-identified patent and that said Letters Patent is hereby corrected as shown below:

Column 5,
Line 3, "according as" should read -- depending on whether --.
Line 7, "according as" should read -- depending on whether --.
Line 16, "according as" should read -- depending on whether --.
Line 35, "according as" should read -- depending on whether --.

Column 6,
Line 15, "according as" should read -- depending on whether --.
Line 20, "according as" should read -- depending on whether --.
Line 31, "according as" should read -- depending on whether --.
Line 41, "of" should read -- if --.
Line 54, "according as" should read -- depending on whether --.
Line 58, "designatio," should read -- designation, --.

Signed and Sealed this

Eighteenth Day of February, 2003

JAMES E. ROGAN
*Director of the United States Patent and Trademark Office*